United States Patent [19]

Ando et al.

[11] 3,893,136

[45] July 1, 1975

[54] MOTOR DRIVEN CAMERA

[75] Inventors: Kunio Ando, Warabi; Ryuzo Mukoyama, Kitamoto, both of Japan

[73] Assignee: Fuji Photo Optical Co., Ltd., Omiya, Japan

[22] Filed: Jan. 17, 1974

[21] Appl. No.: 434,097

[30] Foreign Application Priority Data
Jan. 20, 1973 Japan.................................. 48-9025

[52] U.S. Cl................................. 354/173; 354/204
[51] Int. Cl............................................ G03b 19/04
[58] Field of Search........... 354/204, 173, 258, 170, 354/171, 212, 205, 206; 352/121, 169; 242/71.5

[56] References Cited
UNITED STATES PATENTS

| | | | |
|---|---|---|---|
| 3,590,710 | 7/1971 | Uno et al. | 354/173 |
| 3,594,747 | 7/1971 | Cronin | 354/75 X |
| 3,595,152 | 7/1971 | Douglas | 354/258 X |
| 3,688,669 | 9/1972 | Ogiso et al. | 354/171 |
| 3,754,455 | 8/1973 | Tsujimoto et al. | 354/173 |
| 3,783,763 | 1/1974 | Whitley et al. | 354/206 X |

*Primary Examiner*—John M. Horan
*Attorney, Agent, or Firm*—Fleit & Jacobson

[57] ABSTRACT

An electric motor is provided in the camera to actuate a mechanism to charge the shutter and feed the film upon release of the shutter. A shutter release signal generating circuit is connected with a one shot multivibrator which is connected with a flip-flop circuit connected with the motor to operate the motor. Upon generation of the shutter release signal, the one shot multivibrator is energized to generate a pulse signal which actuates a shutter release mechanism. When the pulse generated from the one shot multivibrator falls, the flip-flop is actuated to start the motor to charge the shutter and feed the film. Upon completion of the shutter charge and the film feed, a signal is generated and put into the flip-flop circuit to stop the motor.

16 Claims, 7 Drawing Figures

3,893,136

MOTOR DRIVEN CAMERA

BACKGROUND OF THE INVENTION

1. Field of the Invention

This invention relates to a photographic camera which is driven by an electric motor, and more particularly to an automatic camera driven by a motor in which the shutter is charged and the film is fed by one frame automatically upon release of the shutter. The motor is started to charge the shutter and feed the film upon release of the shutter and stopped upon completion of the shutter charge and the film feed.

2. Description of the Prior Art

An automatic motor driven camera in which the film is fed and the shutter is charged by an electric motor automatically upon release of the shutter has been well known in the art. Particularly, the motor driven camera has been popularized in the field of still cameras using film of 35mm size. In most of the conventional motor driven cameras, the operation of the camera is controlled by mechanical controlling means. Such a mechanism has a complicated construction and large weight, and accordingly there results a considerable increase in the overall weight and the price of the camera.

Another disadvantage inherent in the above-described conventional cameras is that the controlling mechanism used in one kind of camera cannot be used in another kind because the controlling mechanism is constituted of mechanical parts particularly designed for the particular camera construction. Further, it is difficult to partialy change the sequence of operation once the camera has been designed and constructed since the control means is composed of mechancial parts.

SUMMARY OF THE INVENTION

In view of the above-described defects inherent in the conventional motor driven cameras, it is an object of the present invention to provide a motor driven camera which has a simple mechanical construction and small weight and size.

Another object of the present invention is to provide a motor driven camera in which the operation control means is mainly comprised of an electric circuit.

Still another object of the present invention is to provide a motor driven camera having an electric controlling means which can be adapted to various types of cameras.

A further object of the present invention is to provide a motor driven camera in which a part of the operation sequence can be easily changed.

As in the conventional motor driven camera, motor driven camera in accordance with the present invention employs an electric motor to drive the mechanism within the camera. It further includes a transistor switching circuit which is controlled by a flip-flop circuit between the motor and the power supply. An electric signal generated upon completion of the shutter release is given to the flip-flop circuit to close the transistor switching circuit and rotate the motor to feed the film by one frame and charge the shutter, and another electric signal generated upon completion of the shutter charge and the film feed is given to the flip-flop circuit to open the transistor switching circuit and stop the motor. Since the controlling means in accordance with the present invention mainly comprises an electric circuit, and the mechanical construction associated with the circuit is considerably simplified, the controlling means can be easily adapted to be used in various types of cameras. Further, the camera using the controlling means in accordance with the present invention can be manufactured at a low cost. In addition, since the controlling means comprises an electric circuit, the sequence of operation can easily be changed as desired.

In the motor driven camera in accordance with the present invention, the operation sequence of the camera is controlled by an electric circuit and accordingly it is possible to remote-control the camera or automatically repeat the operation of the camera to take successive pictures. For instance, by actuating the shutter to make an exposure by the signal generated upon completion of all the steps of a process of operation, the shutter release, shutter charge and film feed can be automatically repeated. Further, it becomes possible to prevent a misoperation of the camera by giving a signal which indicates that the camera is performing an operation to a gate circuit which in turn is connected between a shutter release signal generating circuit and a camera operation controlling circuit. The electric signal indicating that the shutter is to be released is transmitted to said control circuit to operate the camera through said gate circuit. When a signal which indicates that the camera is performing an operation, for example that the shutter is being opened or closed or the motor is energized, is being sent to the gate circuit, the shutter release indicating signal is not transmitted to the camera operation control circuit.

Since the controlling means employed in the camera in accordance with the present invention is mainly composed of an electric circuit, the controlling means can easily be used in various types of cameras.

PREFERRED EMBODIMENT OF THE INVENTION

Figure 1:
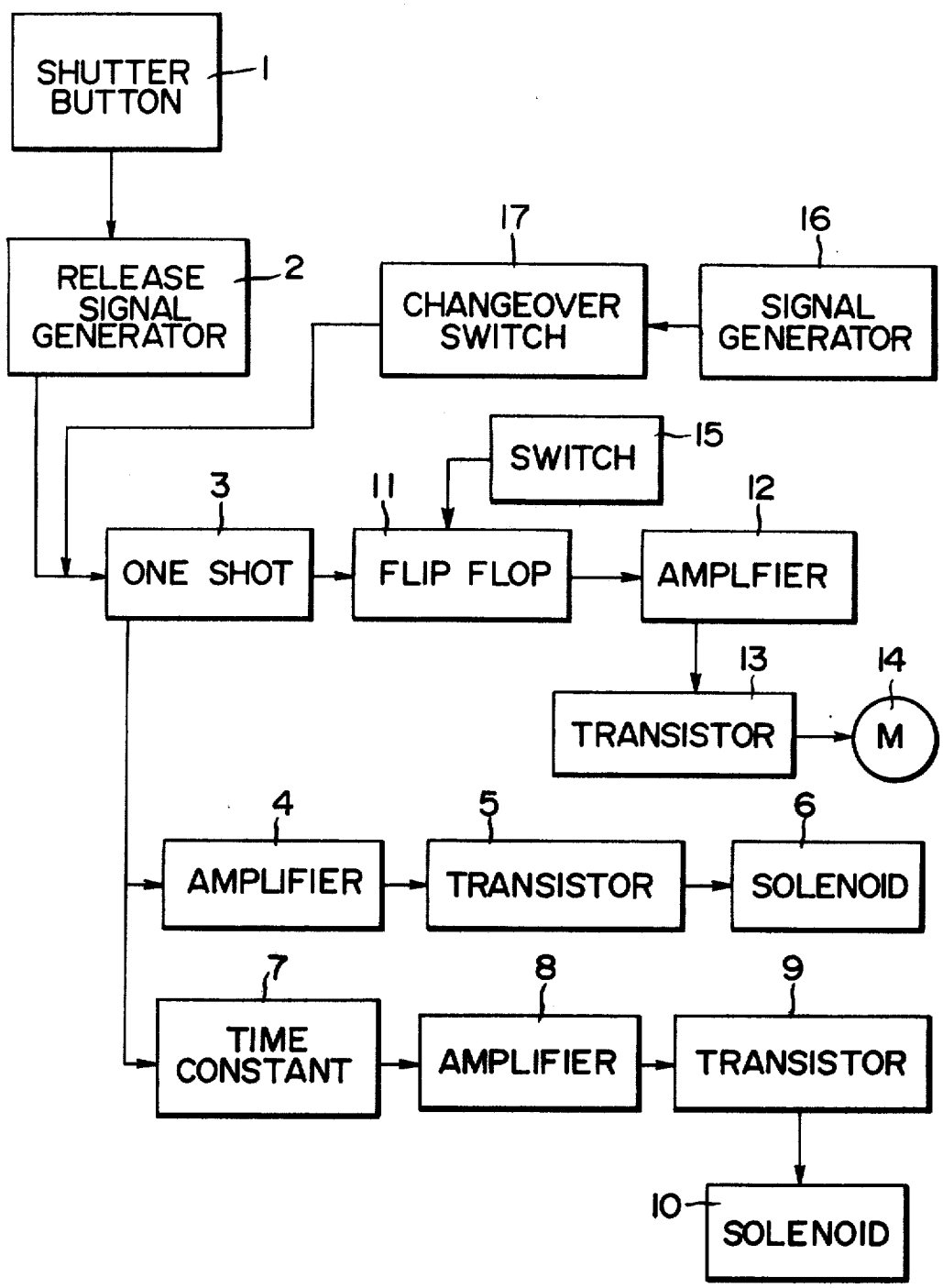
FIG. 1 is a block diagram showing the basic control system for controlling the operation of the camera employed in the motor driven camera in accordance with the present invention.

Now referring to FIG. 1 showing the basic control system to control the operation sequence of the motor driven camera in accordance with the present invention, a release signal generating circuit 2 is connected with a shutter release button 1 to generate a signal for starting the operation of the camera upon release of the shutter mechanism in the camera. Although the shutter is controlled by an electric switch means in this invention, this switch means will be referred to as a shutter button since the shutter is opened and closed by the release signal generated upon its depression. A one shot multivibrator 3 is connected with the release signal generating circuit 2 and generates a pulse signal of a predetermined width in response to generation of the release signal. The width of the pulse generated by the one shot multivibrator 3 is determined to correspond to the exposure time. An amplifier 4 is connected with the one shot multivibrator 3 to transmit the pulse signal from the one shot multivibrator 3 to a transistor switch 5 which is connected with a solenoid 6 to open the shutter. In response to the rise of the pulse generated by the one shot multivibrator 3, the transistor switch 5 is actuated to deenergize the solenoid 6 to open the shutter. A time constant circuit 7 comprising an integrating circuit for setting the shutter speed is connected with said one shot multivibrator 3. The shutter speed setting time constant circuit 7 is connected with a solenoid 10 to close the shutter through an amplifier 8 and a transistor 9. The time constant circuit 7 is also actuated in response to the rise of the pulse generated by the one shot multivibrator 3, and accordingly, the solenoid 10 is deenergized to close the shutter when the time set by the time constant circuit 7 has lapsed.

A flip-flop circuit 11 is connected with said one shot multivibrator 3 so as to be operated thereby in response to the fall of the pulse generaged thereby. The flip-flop circuit 11 is connected with an electric motor 14 through an amplifier 12 and a transistor switch 13 to start and stop the motor 14. When the pulse signal generated by the one shot multivibrator 3 falls, the flip-flop circuit 11 is actuated to close the transistor switch 13 and start the motor 14. The flip-flop circuit 11 is provided with a switch 15 to generate a signal upon completion of the film feed and the shutter charge after the shutter is closed.

The one shot multivibrator 3 is connected with an operation completion signal generating circuit 16 which generates a signal when the rotation of the motor is completely stopped. Between the one shot multivibrator 3 and the signal generating circuit 16 is provided a changeover switch 17 which changes the operation of the camera between one shot photographing operation and successive exposure operation. When the changeover switch 17 is switched to the successive exposure operation side, the operation completion signal generated by the circuit 16 is transmitted to the one shot multivibrator 3 when one cycle of camera operation is finished to repeat the operation successively.

In operation of the camera including a control system as described hereinabove, a release signal is generated from the release signal generating circuit 2 upon depression of the shutter button 1 and is put into the one shot multivibrator 3 to generate a pulse signal having a width corresponding to the exposure time of the shutter. In response to the rise of the pulse signal from the one shot multivibrator 3, the amplifier 4 and the time constant circuit 7 start to work and the shutter opening solenoid 6 is deenergized to open the shutter immediately. After the time set by the time constant circuit 7 has lapsed, the shutter closing solenoid 10 is deenergized to close the shutter. Thus, the exposure is completed. On the other hand, in response to the fall of the pulse signal from the one shot multivibrator 3, the flip-flop circuit 11 is actuated to close the transistor switch 13 to start the motor 14. Thus, the motor 14 starts to rotate after the shutter is closed.

By the rotation of the motor 14, the film is fed by the length of one frame and the shutter is charged to be ready for the subsequent exposure. When the film feed and the shutter charge have been completed, the switch 15 is actuated to generate a completion signal and the signal is put into the flip-flop circuit 11 to open the transistor switch 13 and stop the motor 14. Thus, the preparation for the subsequent exposure is completed.

When successive exposure photography is desired, the operation completion signal generated by the signal generating circuit 16 is put into the one shot multivibrator 3 through the changeover switch 17 after the motor 14 has been completely stopped and one cycle of camera operation has been completely finished, whereby the camera operation is automatically repeated.

It will be understood that the time constant circuit 7 can be replaced by an automatic exposure circuit which detects the illumination of the subject to be photographed and changes the time of operation according to the degree of illumination. Further, it will readily be understood that the shutter can be mechanically opened upon depression of the shutter button 1 instead of using the shutter opening solenoid 6. It will be noted that various other modifications and variations can be effected based on the principal construction of the present invention as defined in the appended claims and described in detail hereinbelow.

Now an embodiment of the present invention will be described in detail with reference to FIGS. 2 to 7, in which a motor driven camera using a large size roll film having a width of 127mm (5 inch) (image size: 125mm × 90mm) is illustrated. This camera is automatically made ready for the taking of photographs by closing the power supply switch and, after the power switch is closed, simple depression of the shutter button is sufficient to open and close the shutter, feed the film by the length of one frame and charge the shutter in preparation for subsequent photographing. Further, if the changeover switch is turned to the successive exposure side, the operation of the camera as described hereinabove is automatically repeated while the shutter button is being depressed to take successive pictures.

Figure 2:
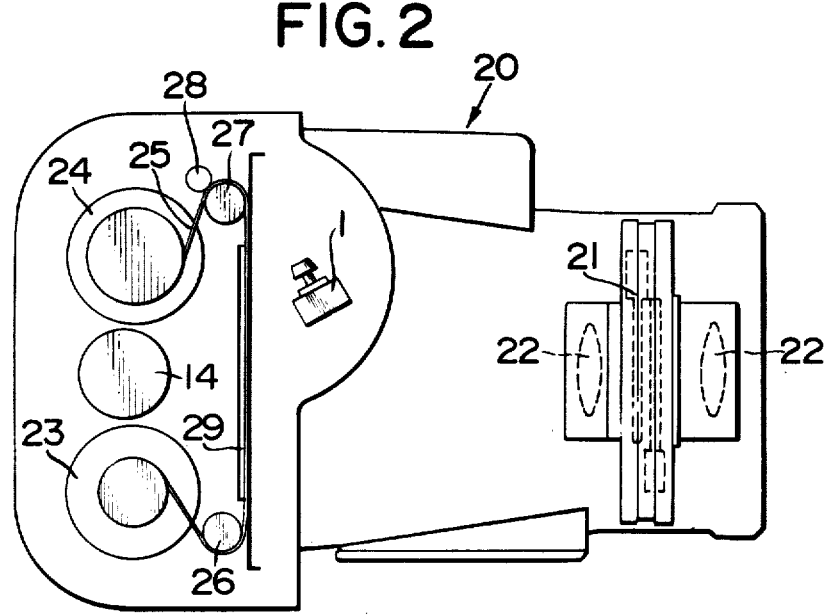
FIG. 2 is a schematic internal side view of the motor driven camera in accordance with the present invention.

Referring to FIG. 2 schematically showing the construction of the motor driven camera loaded with a roll film in accordance with the embodiment of the present invention in which the same elements as those shown in FIG. 1 are indicated by the same reference numerals, a shutter button 1 is provided on the camera body 20 of the camera. A shutter 21 is provided between lenses 22 mounted to the camera body 20. An electric motor 14 is provided within the camera body to feed the film and charge the shutter. The film 25 is fed out from a film feed out spool 23 and taken up by a film take-up spool 24 by way of film guide roller 26, a film pressure plate 29, a metering roller 27 and a pressure roller 28. The pressure roller 28 is pressed on the metering roller 27 to securely pinch the film 25 therebetween. In operation of the camera as shown in FIG. 2, upon supply of the power to the camera by closure of the power supply switch, the motor 14 starts to rotate and the film pressure plate 29 is separated from the film 25 and the film 25 is fed. When the film feed is finished, the film pressure plate 29 is put into pressure contact with the film 25 to keep the film flat on the focal plane. On the other hand, while the film 25 is being fed, charging of the shutter 21 begins and when the shutter charge is completed the shutter charge member returns to the original position and the preparation for photographing is completed. Then, by depressing the shutter button 1, the shutter release signal is generated and the shutter 21 is opened and closed to make an exposure. By the signal generated upon completion of the shutter closure, the motor 14 is operated again to feed the film and charge the shutter to prepare for the subsequent exposure. Thus, the camera automatically operates to take a picture and prepare for the subsequent exposure when the shutter button is simply depressed once. When it is desired to take successive pictures, the shutter 21 is actuated by a signal generated upon completion of the preparation for the subsequent exposure. The successive photographing operation of the camera in accordance with the present invention will be described in detail hereinafter.

Figure 3:
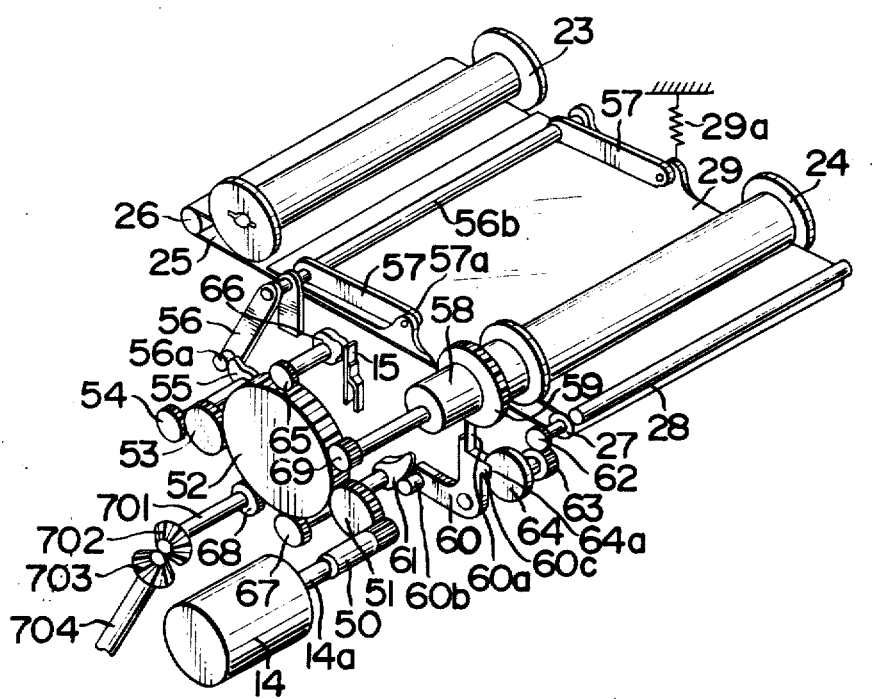
FIG. 3 is a perspective view of the main part of the controlling mechanism with the shutter mechanism omitted employed in the camera in accordance with the present invention.

Referring to FIG. 3 showing the main mechanical construction of the camera in accordance with the present invention excluding the shutter mechanism, an explanation is now given of the operation thereof from the start of rotation of the motor 14 to the completion of the preparation for the subsequent exposure. A drive gear 50 is fixed to the drive shaft 14a of the motor 14 to transmit the rotation of the motor 14 to a gear 54 through a gear train consisting of idler gears 51, 52 and 53. The gear 54 is coaxially fixed to a film pressure plate operating cam 55 which in turn is engaged with a cam follower 56a of a film pressure plate operating lever 56. The pressure plate operating lever 56 is secured to a shaft 56b to which a pair of second pressure plate operating levers 57 are fixed. The second pressure plate operating levers 57 are associated with the pressure plate 29 at the end 57a thereof. The film pressure plate 29 is spring biased by a tension spring 29a to be separated from the film 25. When the pressure plate operating cam 55 is detached from the cam follower 56a, the operating lever 56 is moved by the force of said spring 29a to lift the pressure plate 29 off the film 25. When the cam 55 is rotated counterclockwise to push the cam follower 56a and move the same, the pressure plate operating lever 56 is rotated clockwise to move said second pressure plate operating levers 57 clockwise and move the pressure plate 29 into pressure contact with the film 25.

The film take-up spool 24 is coaxially associated with a pinion 69 which is meshed with said idler gear 52, by way of a one-way slip clutch 58 and a dividing ratchet 59 which in turn is engaged with a pawl 60a mounted to one end of a dividing lever 60. The dividing lever 60 is provided at the other end thereof with a cam follower pin 60b which in turn is engaged with a dividing lever releasing cam 61. Thus, while the dividing pawl 60a is engaged with the ratchet 59 of the take-up spool 24, the spool 24 is not rotated owing to the operation of said one-way slip clutch 58 even if the pinion 69 is rotated by the idler gear 52. The dividing lever releasing cam 61 is fixed to a pinion 67 which is meshed with the idler gear 52 so that the dividing lever releasing cam 61 may be indirectly associated with said pressure plate operating cam 55. The timing of rotation of both cams 61 and 55 is so selected that the dividing lever 60 is disengaged from the dividing ratchet 59 after the pressure plate 29 is lifted and separated from the film 25. Therefore, after the film pressure plate 29 is lifted and separated from the film 25, the rotation of the motor 14 is transmitted to the film take-up spool 24 by way of the drive gear 50, idler gears 51 and 52, the pinion 69 and the one-way slip clutch 58 to start the film feed. The film 25 is fed out from the film feed out spool 23 and taken up by the film take-up spool 24 by way of the film guide roller 26, the pressure roller 28 and the film metering roller 27. The film metering roller 27 meters the length of the film fed between the pressure roller 28 and the metering roller 27. The metering roller 27 is provided with a gear 62 which is meshed with a gear 63 which in turn is fixed to a dividing cam 64 engaged with a projection 60c of said dividing lever 60. When the metering roller 27 is rotated by the feed of a predetermined length of the film 25, the dividing cam 64 is rotated up to a position where the projection 60c of the dividing lever 60 falls into the recess 64a of the dividing cam 64. When the projection 60c of the dividing lever 60 falls into the recess 64a of the dividing cam 64, the dividing pawl 60a comes into engagement with the ratchet 59 to hold the same and the film take-up spool 24 is stopped by the slip in the one-way slip clutch 58 so that take up of the film 25 is stopped. When the film is fed by the predetermined length corresponding to one frame of image, the pressure plate operating cam 55 associated with the motor 14 is rotated counterclockwise to rotate the pressure plate operating lever 56 clockwise and move the film pressure plate 29 down into pressure contact with the film 25.

The idler gear 52 is further meshed with a gear 65 coaxially fixed to an operation completion indicating cam 66 which is in engagement with said switch 15 for generating a signal upon completion of the film feed and the shutter charge. When the shutter is charged and the film is fed by the predetermined length, the operation completion indicating cam 66 closes the switch 15 to generate the signal which indicates the completion of the shutter charge and the film feed. Upon generation of the signal, the motor 14 is stopped as mentioned before referring to FIG. 1. The idler gear 52 is further provided with a gear 68 which is associated with a shutter charge mechanism which will be described in detail hereinbelow so that the shutter may be charged during the above operation of the camera.

Now the construction and the operation of the shutter mechanism including said shutter charge mechanism will be described in detail with reference to FIGS. 3 and 4. A first shutter charge shaft 701 having at one end thereof said gear 68 meshed with the idler gear 52 and at the other end thereof a bevel gear 702 is provided in parallel with the shafts of said idler gears 51, 52 and 53. A second shutter charge shaft 704 having at one end thereof a bevel gear 703 meshed with said bevel gear 702 is joined at the other end thereof with an end of a third shutter charge shaft 705 which has a gear 706 at the other end thereof. The gear 706 is meshed with a gear 708 fixed to one end of a fourth shutter charge shaft 708 which has at the other end thereof a semi-circular gear 709. With said semi-circular gear 709 is meshed a spur gear 710 fixed to a fifth shutter charge shaft 711 which has at one end thereof a pin coupling wheel 712. The fifth shaft 711 is spring urged to rotate in the direction shown by an arrow 711a by means of a coil spring 711b wound on the shaft 711. By one rotation of the semi-circular gear 709, the spur gear 710 is rotated by 180° and then rotated backward by the spring force of the coil spring 711b. The pin coupling wheel 712 has a coupling pin 712a which is engaged with a coupling pin 713a of a pin coupling wheel 713 fixed at an end of a sixth shutter charge shaft 714. The sixth shutter charge shaft 714 has at the other end thereof a shutter operating ring 71 rotatably mounted thereto. The shutter operating ring 71 has a cut-away ring portion 71a fixed thereto having two radially extending end faces 71b and 71c. A shutter closing cam 72 is integrally fixed to said sixth shutter charge shaft 714 between said shutter operating ring 71 and said pin coupling wheel 713. A coil spring 73 is engaged between the shutter closing cam 72 and the shutter operating ring 71 with one end thereof 73a fixed to the cam 72 and the other end thereof 73b engaged between said end faces 71b and 71c of the cut-away ring portion 71a. Between the shutter closing cam 72 and the pin coupling wheel 713 is provided a flange 715 fixed to the sixth shutter charge shaft 714. Between the flange 715 and said shutter closing cam 72 is provided a bearing 716 fixed to a part 717 of the shutter housing to rotatably support the sixth shutter charge shaft 714. A coil spring 74 is engaged between the flange 715 and the bearing 716 so that the coil spring 74 may be charged when the flange 715 is rotated in the direction indicated by an arrow 714a. The bearing 716 is provided with several engaging portions 716a to permit control of the tension of the spring wound on the sixth shutter charge shaft 714 by selecting the position of engagement. When the shutter closing cam 72 is rotated in the direction of the arrow 714a, said coil spring 73 is also charged if the ring portion 71a is locked. Thus, by the rotation of the sixth shutter charge shaft 714 in the direction indicated by the arrow 714a, said coil springs 73 and 74 are both charged. The cut-away ring portion 71a is engaged with a pawl 75a formed at one end of a shutter opening lever 75 which is pivotally mounted on a pivot 75b. The other end of the shutter opening lever 75 has a fork-shaped engaging portion 75c which is engaged with a pin 76a fixed at one end of a shutter opening operating lever 76. The operating lever 76 is pivotally mounted on a pivot 76b and the other end 76c thereof is associated with said shutter opening solenoid 6 so as to be pulled thereby when the solenoid 6 is energized. The operating lever 76 is spring biased by means of a tension spring 76d to move said end 76c away from the solenoid 6. Said shutter closing cam 72 is engaged with a pawl 77a formed at one end of a shutter closing lever 77 pivotally mounted to a pivot 77b. The shutter closing lever 77 is pivoted with a shutter closing operating lever 78 similarly to said shutter opening lever 75. The operating lever 78 is associated with said shutter closing solenoid 10 and spring biased to be separated from the solenoid 10 by a tension spring 78a. By the energization of the shutter closing solenoid 10, the shutter closing operating lever 78 is pulled by the solenoid 10 and rotated to put said paw 77a into engagement with said cam 72. Said shutter operating ring 71 is associated with shutter blades 210 by way of a shutter operating lever 79 linked therebetween. When the ring 71 is rotated in the direction indicated by an arrow 71d, the shutter blades 210 are opened, and when the ring 71 is rotated in the direction of an arrow 71e the shutter blades 210 are closed.

Figure 4:
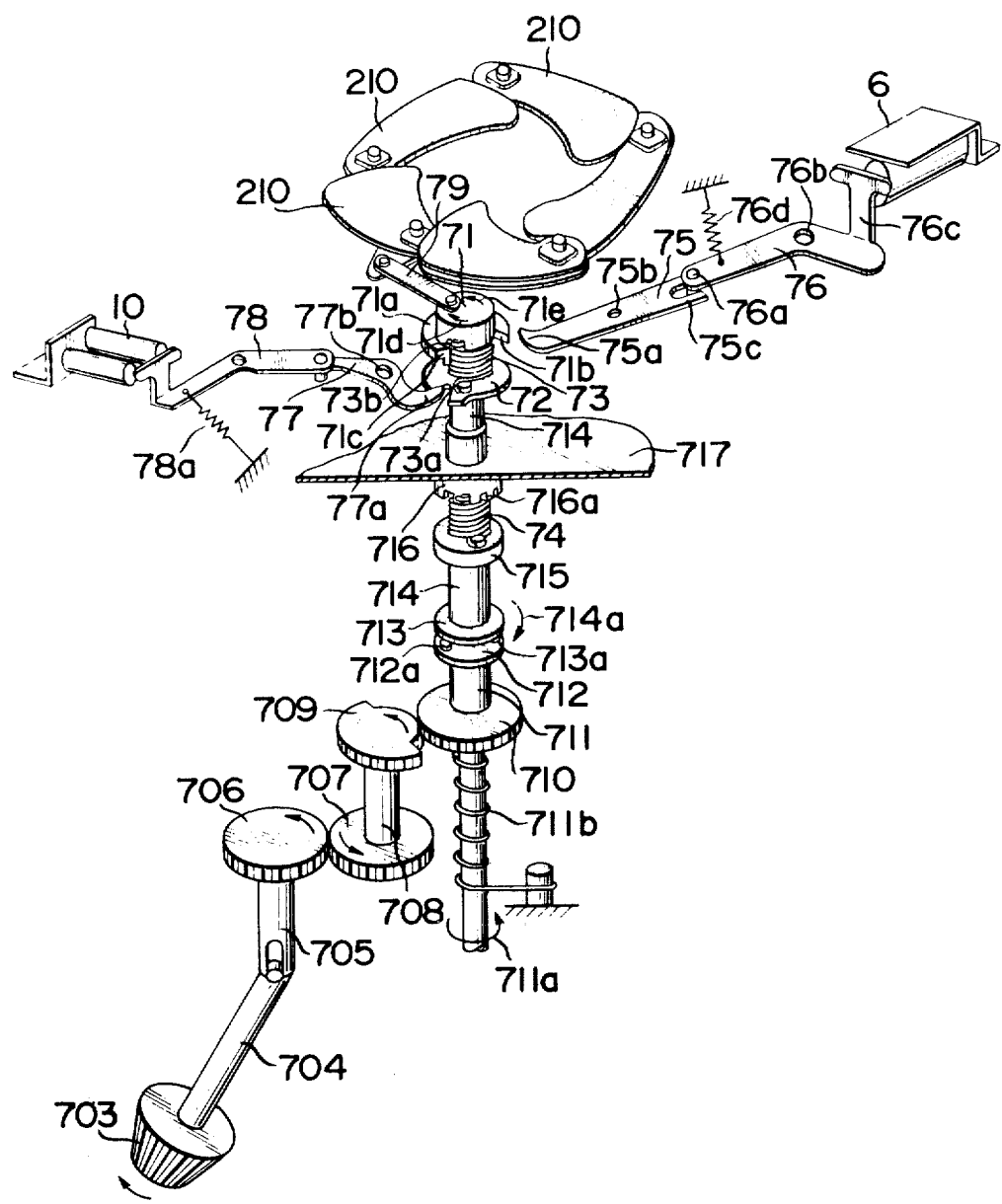
FIG. 4 is a perspective view of the shutter mechanism employed in the camera of this invention.

In operation of the shutter mechanism as shown in FIG. 4 which has been described in detail hereinabove, the shutter opening solenoid 6 and the closing solenoid 10 are supplied with the electric power and energized upon closure of the main power supply switch and the pawl 75a of the shutter opening lever 75 and the pawl 77a of the shutter closing lever 77 are both in the engaging position to hold the shutter operating ring 71 and the shutter closing cam 72, respectively. When the motor 14 is started, the sixth shutter charge shaft 714 is rotated in the direction of the arrow 714a by the half rotation of the fifth shutter charge shaft 711 which is half-rotated by the semi-circular gear 709 which in turn is rotated by the motor 14 through the gear train including said gears 50, 51, 52, 68, 702, 703, 706 and 707. By the rotation of 180° of the sixth shutter charge shaft 714, the shutter closing cam 72 is rotated to be put into engagement with said pawl 77a of said shutter closing lever 77. While the sixth shutter charge shaft 714 is rotated, the coil springs 73 and 74 are tightened to charge the spring force by the rotation of the cam 72 and the flange 715. Thus, the shutter opening spring 73 and the shutter closing spring 74 are charged. Then, by deenergization of the shutter opening solenoid 6 the end 76c of the shutter opening operating lever 76 is released from the solenoid 6 and the lever 76 is rotated clockwise in FIG. 4 by the tension of the spring 76d and the shutter opening lever 75 is rotated counterclockwise to disengage the pawl 75a from the end face 71b of the cutaway ring portion 71a of the shutter operating ring 71. Therefore, the shutter operating ring 71 is rotated in the direction of the arrow 71d to open the shutter blades 210 by the force of the coil spring 73. Then, when the shutter closing solenoid 10 is deenergized after a time determined by the shutter speed, the shutter closing operating lever 78 is released from the solenoid 10 and rotated counterclockwise by the tension of the spring 78a and accordingly the shutter closing lever 77 is rotated clockwise to disengage the pawl 77a from the shutter closing cam 72. Accordingly, the shutter closing cam 72 is rotated counterclockwise by the force of the coil spring 74. Since said shutter operating ring 71 is engaged with the end 73b of the spring 73 at the end face 71b and 71c thereof, the counterclockwise rotation of the cam 72 causes the end 73b of the coil spring 73 to push the end face 71b of the ring portion 71a. Therefore, the shutter operating ring 71 is rotated in the direction of the arrow 71e to close the shutter blades 210 when the shutter closing cam 72 is released and rotated counterclockwise. Since the fifth shutter charge shaft 711 is spring urged by said coil spring 711b in the direction of the arrow 711a, the fifth shaft 711 is returned to its original position after it has been rotated by 180° by the semi-circular gear 709 and released therefrom.

Figure 5:
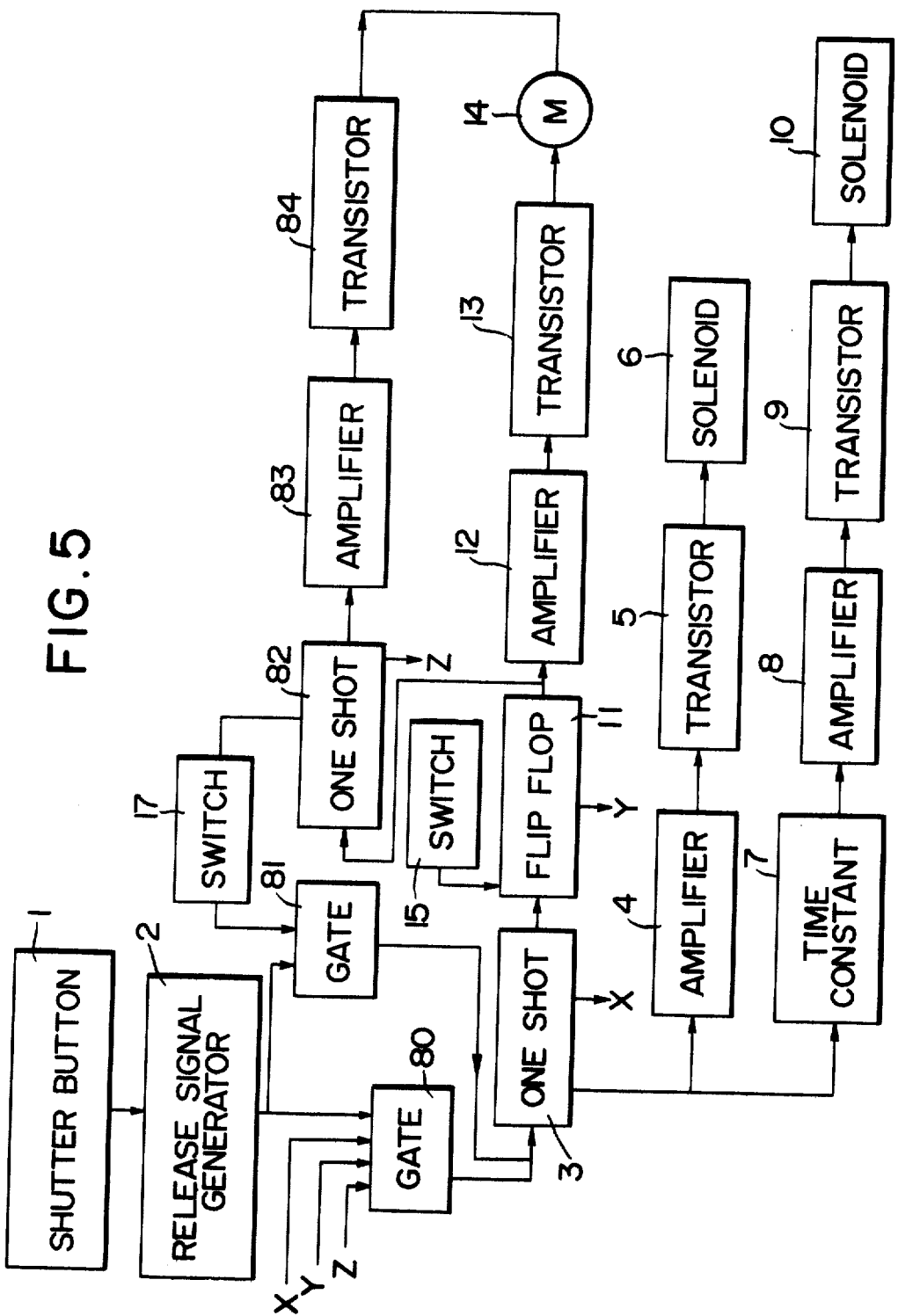
FIG. 5 is a block diagram showing the electric circuit for controlling the operation of the camera employed in the motor driven camera in accordance with a particular embodiment of this invention.

The mechanism described hereinabove referring to FIGS. 3 and 4 is operated by the electric control circuit as shown in FIG. 1. In a practical power driven camera, a motor braking means and a malfunction preventing means are preferred to be incorporated in the camera. One of the embodiments of the electric control circuit employed in such a practical camera is shown in FIG. 5. Now referring to FIG. 5, the more practical electric control cicrcuit employed in the present invention includes in addition to the circuit shown in FIG. 1, a motor braking system comprising a one shot multivibrator 82, an amplifier 83 and a transistor switch 84, and a gate circuit 80 to prevent the malfunction of the camera. The elements shown in FIG. 5 which are the same as those shown in FIG. 1 are indicated with the same reference numerals and the description thereof is omitted here.

The purpose of providing the motor braking means in the electric control circuit is to ensure the quick stoppage of the film when the film feed is completed so that the film pressure plate 29 may smoothly press the film and obtain good flatness thereof after the film has been completely stopped. If the motor continues rotation by its inertia, the operation of the film pressure plate 29 is badly affected by the running film 25. The motor braking means is required to quickly stop the motor upon generation of the signal which indicates the completion of the film feed. Referring to FIG. 5, a one shot multivibrator 82 is connected with the flip-flop 11 and is further connected with the motor 14 through an amplifier 83 and a transistor switch 84 connected in series. Between the release signal generating circuit 2 and said one shot multivibrator 3 is inserted a gate circuit 80 which will be described in detail hereinafter. Another gate circuit 81 is connected in parallel with said gate circuit 80. The latter gate circuit 81 is connected with said one shot multivibrator 82 by way of a switch 17. The one shot multivibrator 82 generates a pulse signal the width of which is of sufficient time duration to stop the motor 14.

In operation, simultaneously with the supply of the signal from the film feed completion switch 15 to the flip-flop 11 and operation of said amplifier 12 to open the switch 13 to deenergize the motor 14, the one shot multivibrator 82 is operated to generate a pulse the width of which is of sufficient time duration ($t$) to stop the motor 14. The pulse from the one shot multivibrator 82 is supplied to the transistor switch 84 through the amplifier 83 to close the transistor switch 84 to perform dynamic braking on the motor 14. An example of the circuit to perform the dynamic braking of the motor 14 is shown in FIG. 6, in which the elements corresponding to those shown in FIG. 5 are indicated by the same reference numerals.

Figure 6:
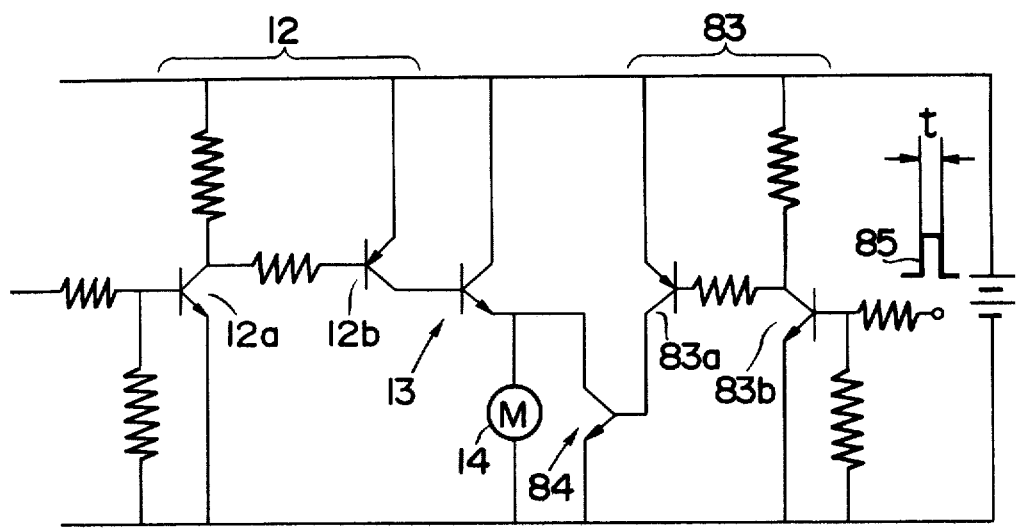
FIG. 6 is one embodiment of an electric circuit for quickly stopping the motor in this invention.

Referring to FIG. 6, a transistor switch 13 is connected in series with the motor 14 which is connected in parallel with a transistor switch 84 so that the latter transistor switch 84 may be opened while the former transistor switch 13 is closed. An amplifier 12 comprising two transistors 12a and 12b is connected between the transistor switch 13 and a flip-flop (not shown; corresponding to the flip-flop 11). An amplifier 83 comprising two transistors 83a and 83b is connected in series with said transistor switch 84. In operation, when the transistor switch 13 is opened by the flip-flop 11 through the amplifier 12, a pulse 85 having the width of time ($t$) is given to the amplifier 83 by the one shot multivibrator 82 to close the transistor switch 84 for the time ($t$) of the width of the pulse 85 for braking the motor 14. Therefore, upon supply of the film feed completion signal from the switch 15 to the flip-flop 11, the motor 14 is braked to stop.

The camera operation control circuit shown in FIG. 5 is further provided with a means for preventing a release of the shutter during rotation of the motor 14 caused by a careless depression of the shutter button. For instance, while the motor is rotating to feed the film, the shutter must be prevented from being released. Referring to FIG. 5, a gate circuit 80 is inserted between the shutter release signal generating circuit 2 and the one shot multivibrator 3 which generates a signal for operating the shutter mechanism. To the gate circuit 80 are supplied various signals which indicate that the camera is in operation. From the one shot multivibrator 3 a signal X is supplied to the gate circuit 80 which indicates that the one shot multivibrator 3 is generating a pulse signal having a width corresponding to the shutter speed. From the flip-flop 11 a signal Y is supplied to the gate circuit 80 which indicates that the flip-flop 11 is in operation and accordingly the motor 14 is rotating. From the one shot multivibrator 82 a signal Z is supplied to the gate circuit 80 which indicates that the one shot multivibrator 82 is in operation and accordingly the motor 14 is still rotating. The gate circuit 80 is so operated that the release signal from the generating circuit 2 cannot be transmitted to the one shot multivibrator 3 through the gate circuit 80 while one of said signals X, Y and Z is put into the gate circuit 80, whereby the malfunction of the camera is prevented.

In the embodiment shown in FIG. 5, the changeover switch 17 for selection of one-shot photography or successive photography is connected between said one shot multivibrator 82 and said gate circuit 81 so as to give a signal to the gate circuit 81 upon the fall of the pulse generated from the one shot multivibration 82, when said changeover switch 17 is closed. Thus, a signal representing the completion of the camera operation is put into the gate circuit 81. On the other hand, the gate circuit 81 is supplied with the release signal from the release signal generating circuit 2. Only when both the release signal from the circuit 2 and the signal from the switch 17 are put into the gate circuit 81, the signal indicating the completion of the camera operation from the switch 17 is transmitted through the gate circuit 81 to the one shot multivibrator 3 to start the camera operation again and repeat the operation. Thus, the release of the shutter can be repeated any number of times by keeping the shutter button depressed.

Figure 7:
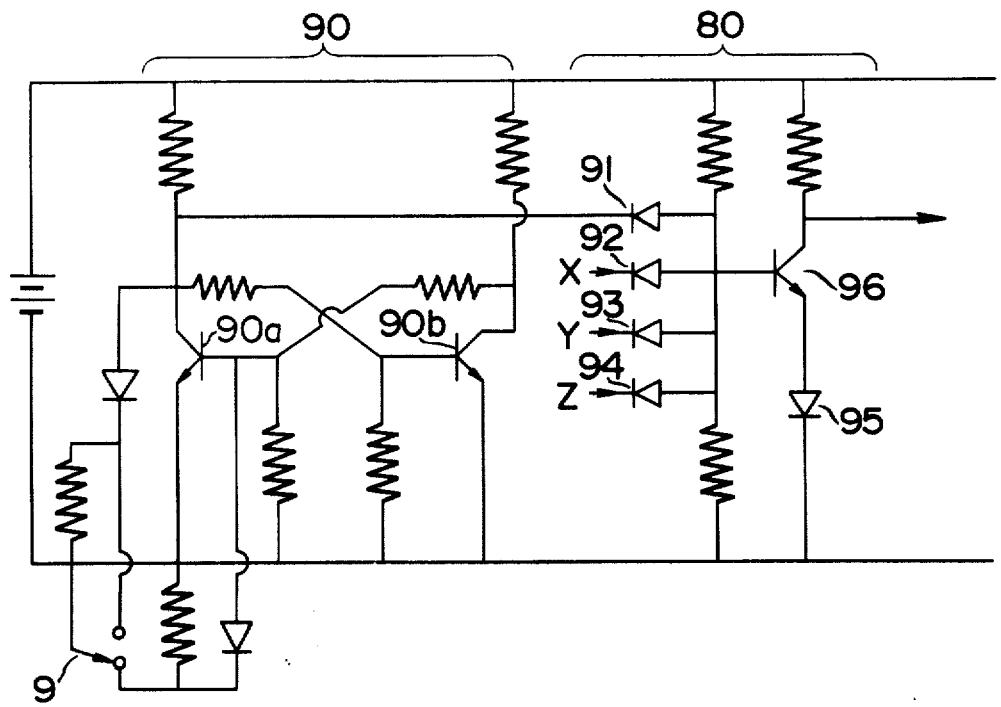
FIG. 7 is one embodiment of an electric circuit including a release signal generating circuit and a gate circuit employed in the present invention.

The flip-flop 11 is provided with a resetting means to generate a singal for rotating the motor upon closure of the power supply switch, and accordingly, the film is fed and the shutter is charged automatically to prepare for the exposure upon closure of the power supply switch. The release signal generating circuit 2 may be constituted by a simple circuit for generating an electric signal including a mechanical contact. However, the mechanical contact is liable to cause malfunction of the camera operation owing to the chatter of the contact. Therefore, the generation of the release signal is preferred to be performed by an electric means. One example of the electric means for generating the release signal is shown in FIG. 7. A switch 9 is connected with a flip-flop 90 comprising two transistors 90a and 90b to generate a release signal to eliminate the chatter. FIG. 7 further shows an example of the gate circuit 80 comprising diodes 91, 92, 93, 94 and 95 and a transistor 96. Further, since the release signal passing through the gate circuit 80 is put into the one shot multivibrator 3 after being differentiated, the one shot multivibrator 3 will be operated only once even if the shutter button is kept depressed in case of one shot photography, and accordingly the shutter is released only once.

It will be understood that the present invention is not limited to the embodiment as described hereinabove, but various modifications and variations can be ef-

What is claimed is:

1. In a motor driven camera in which the shutter is charged and film is fed by the power of a motor built in the camera body, the improvement comprising:
   a power supply,
   an electric motor associated with a shutter charge means and a film feed means for charging the shutter and feeding the film by the rotation thereof,
   a flip-flop circuit connected between the power supply and the electric motor to selectively energize the motor,
   a shutter release signal generating means which generates a signal upon depression of a shutter button,
   a film wind-up completion signal generating means which generates a signal upon completion of the shutter charge and the film feed, and
   a one shot multivibrator which generates a pulse having a width corresponding to the exposure time, said one shot multivibrator being connected with said shutter release signal generating means for generating said pulse upon receipt of a signal therefrom,
   said flip-flop circuit being connected with said one shot multivibrator and said film wind-up completion signal generating means so that the flip-flop circuit is put into a state to energize the motor when the pulse from the one shot multivibrator falls and is put into the other state to deenergize the motor upon receipt of a signal from said signal generating means.

2. A motor driven camera as defined in claim 1 wherein a shutter opening means is connected with said one shot multivibrator to open the shutter upon receipt of the pulse signal from the one shot multivibrator.

3. A motor driven camera as defined in claim 2 wherein said shutter opening means comprises an amplifier directly connected with said one shot multivibrator so that the amplifier may be operated in response to the rise of the pulse generated from the one shot multivibrator.

4. A motor driven camera as defined in claim 3 further comprising a shutter closing means which comprises an amplifier and a time constant circuit connected between the amplifier and the one shot multivibrator so that the amplifier may be operated when a time predetermined by the time constant circuit has lapsed after the rise of the pulse from the one shot multivibrator.

5. A motor driven camera as defined in claim 4 wherein said predetermined time is the shutter exposure time.

6. A motor driven camera as defined in claim 4 wherein said amplifiers of the shutter opening means and the shutter closing means are connected with solenoids to open and close the shutter through transistor switching circuits, respectively.

7. A motor driven camera as defined in claim 1 further comprising a shutter release signal generating means which generates a signal upon depression of a shutter button, a shutter opening means which opens the shutter upon receipt of the signal from said shutter release signal generating means, and a shutter closing means comprising a delay circuit and means for closing the shutter upon receipt of said shutter release signal, said means for closing the shutter being connected with said shutter release signal generating means by way of said delay circuit.

8. A motor driven camera as defined in claim 7 wherein said delay circuit comprises an electric time constant circuit which controls the shutter exposure time.

9. A motor driven camera as defined in claim 1 further comprising a braking switch connected in parallel with said motor to perform a dynamic braking by the closure thereof, and a time constant circuit connected between said second signal generating means and said braking switch, whereby the braking switch is closed during the time long enough to completely stop the motor.

10. A motor driven camera as defined in claim 1 further comprising a shutter release signal generating means which generates a signal upon depression of a shutter button, a shutter release means for operating the shutter upon receipt of the signal from the shutter release signal generating means, and a gate circuit connected between said shutter release signal generating means and said shutter release means for selectively transmitting the shutter release signal to said shutter release means.

11. A motor driven camera as defined in claim 10 wherein said gate circuit is operated to prevent the transmission of said shutter release signal while the camera is in operation.

12. A motor driven camera as defined in claim 11 wherein said gate circuit is supplied with a signal which indicates that the motor is rotating.

13. A motor driven camera as defined in claim 12 wherein said gate circuit is further supplied with a signal which indicates that the shutter is open.

14. A motor driven camera as defined in claim 1 wherein a shutter release means for releasing the shutter upon receipt of a signal is selectively connected with said second signal generating means so that the shutter may be released upon completion of the shutter charge and the film feed to take successive pictures.

15. A motor driven camera as defined in claim 14 wherein a gate circuit is connected between said shutter release means and said second signal generating means, and the gate circuit is connected with a shutter release signal generating means which generates a signal upon depression of the shutter button, whereby the gate circuit operates to transmit the signal from said second signal generating means to said shutter release means only while the shutter release signal is being put into the gate circuit.

16. A motor driven camera as defined in claim 15 wherein a switch is connected between said gate circuit and said second signal generating means to manually connect the second signal generating means to said gate circuit selectively.

* * * * *